Patented June 22, 1943

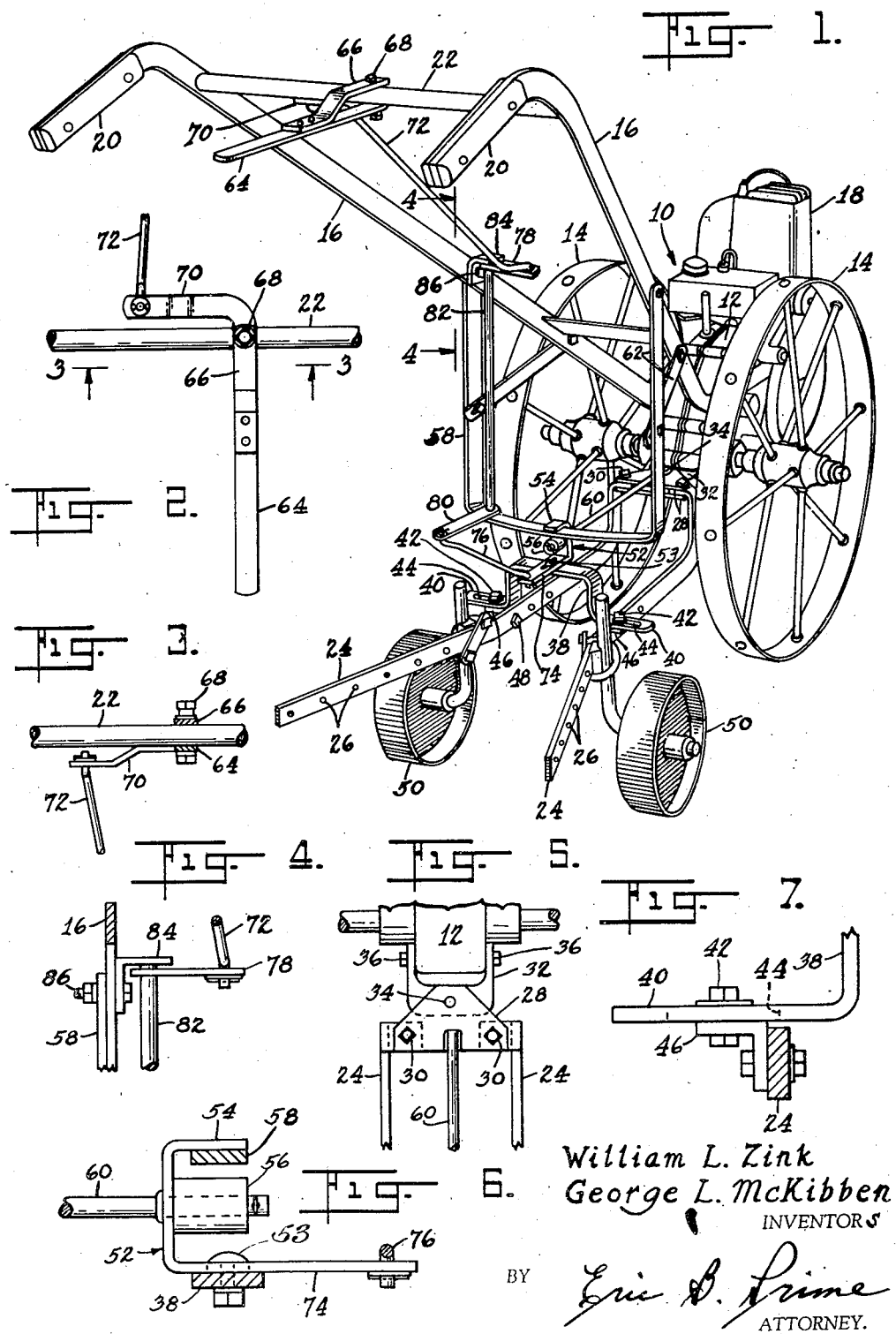

2,322,268

UNITED STATES PATENT OFFICE 2,322,268

TRACTOR IMPLEMENT

William L. Zink, Plano, and George L. McKibben, Kankakee, Ill., assignors to Sears, Roebuck and Co., Chicago, Ill., a corporation of New York Application January 18, 1940, Serial No. 314,426

11 Claims. (Cl. 97—48)

This invention relates generally to agricultural implements and more particularly to tractor implements of the type wherein a two-wheeled tractor is combined with a trailing implement structure.

One of the primary objects of the present invention is to provide an improved and novel implement structure for attachment to a two-wheeled tractor, which is simple in construction, easily assembled and disassembled, and may be quickly and easily attached to or detached from the tractor.

Another important object of the present invention is to provide an improved and novel steering apparatus in combination with a two-wheeled tractor and trailing implement structure, which may be operated continuously without fatigue to the operator.

A further object of this invention is to provide a steering apparatus in combination with a two-wheeled tractor and trailing implement structure, which is simple and sturdy in construction, and which has the elements thereof so arranged that it may be easily actuated.

Other objects and advantages will be apparent from the following description, reference being had therein to the accompanying drawing in which:

Figure 1 is a perspective view of a two-wheeled tractor in combination with a trailing implement structure and a steering apparatus embodying the principles of the present invention;

Figure 2 is a fragmentary plan view of the steering handle in Figure 1 and the structure connected thereto;

Figure 3 is a vertical sectional view taken along the line 3—3 of Figure 2;

Figure 4 is a fragmentary vertical sectional view taken substantially along the line 4—4 of Figure 1;

Figure 5 is a fragmentary plan view of the structure for connecting the implement with the tractor;

Figure 6 is a vertical sectional detail view of the structure for suspending the implement frame from the tractor frame; and Figure 7 is a fragmentary vertical sectional detail view of the structure for adjustably connecting the implement beams.

In the drawing illustrating the invention, a two-wheeled tractor, referred to in its entirety by the reference numeral 10, is provided comprising a transmission incased in a housing 12 carried by a pair of transport wheels 14 which are mounted on axles journaled in the housing and operatively connected to the transmission.

A frame comprising a pair of spaced frame bars 16 is connected to the transmission housing 12 on opposite sides thereof and extends forwardly of the transmission housing for supporting the power unit or motor 18.

The spaced frame bars 16 also extend rearwardly for providing handles 20 and are connected together by a reinforcing cross bar 22 which is preferably welded to the frame bars.

Control elements may be carried by the frame bars 16 and the cross bar 22 for controlling the operation of the motor and the transmission, but inasmuch as these elements are not pertinent to the present disclosure, they are not shown on the drawing.

An implement frame for carrying the tillage tools and adapted for being drawn by the tractor comprises a pair of spaced beams 24 which may be provided with holes 26 for having the tillage tools, not shown, connected therewith.

The beams 24 have the front ends thereof extending upwardly and inwardly for being positioned between a pair of plate members 28 spaced vertically. The beams 24 are swingably connected to the spaced plates 28 by connecting elements or bolts 30 so that the beams 24 may be adjustably positioned laterally relatively to each other.

The spaced plate members 28 are pivotally attached to a drawbar member 32 which extends therebetween, by means of a kingbolt 34, the drawbar member 32 in turn, being secured to the transmission housing 12 by fastening elements 36.

A spacing member 38 having the general shape of an inverted U and provided with outwardly extending end portions 40 is adjustably connected to the beams 24 for retaining the beams in given spaced positions by means of fastening elements or bolts 42 which extend through slotted openings 44 in the extending portions 40 of the spacing member, and angle brackets 46 secured to the beams 24 by connecting elements or bolts 48.

Wheels 50 are mounted on the beams 24 and may be adjustably positioned relatively thereto for properly positioning the tillage tools carried thereby relatively to the ground and for supporting the implement structure.

The implement frame is retained against appreciable vertical movement relatively to the tractor by means of a bracket 52 which is connected to the spacing member 38 by means of a fastening element or bolt 53 extending through the spacing member and a slotted opening in the bracket.

The bracket 52 is provided with a flange portion 54 and a roller 56 positioned on opposite sides of a U-shaped stirrup member 58 connected to and depending from the frame bars 16. The roller 56 is mounted on a stiffening rod 60 which extends through the bracket 52 and is fixedly connected, preferably by welding, to the top plate member 28 and the bracket 52. The stiffening rod 60 retains the bracket 52 in a fixed position relatively to the spaced plate members 28, so that the beams 24 will not move relatively to each other and the plates 28 during the operation of the tractor implement.

As will be noted from Figure 1, the U-shaped stirrup member 58 is retained in a fixed position by means of brace members 62 connected to the stirrup member and the frame bars 16. The brace members 62 are provided with slotted openings for receiving the fastening elements or bolts which connect the brace members to the stirrup member 58 in order that the stirrup member may be swung from between the roller 56 and the flange 54 of the bracket 52 to facilitate connecting and disconnecting the implement structure with the tractor.

From the preceding description it is apparent that the two-wheeled tractor in combination with the trailing implement structure functions in the manner of an articulated four-wheeled vehicle which is directed by turning the tractor to the left or right relatively to the trailing implement structure.

The apparatus for varying the relative positions of the tractor and trailing implement structure comprises a handle 64 having an offset portion 66 for receiving the cross bar 22 therebetween, and swingably connected to the cross bar 22 by a bolt 68 which extends through the handle and the offset portion.

The handle 64 is preferably L-shaped in formation for providing a transverse arm portion 70 which has an opening therein for receiving a rod 72 pivotally connected therewith.

The bracket 52, above described, is also provided with an arm portion 74 which extends rearwardly and has an opening near the outer end thereof for receiving a rod 76 similar to the rod 72. The other ends of the rods 72 and 76 extend through openings in top and bottom arms 78 and 80, respectively, for being pivotally connected therewith.

The top and bottom arms 78 and 80, respectively, are fixedly connected to a vertical shaft 82, preferably by welding, and extend radially therefrom in transverse relationship.

The shaft 82 is extended below the bottom arm 80 for being journaled in the U-shaped stirrup member 58, and is also extended above the top arm 78 for being journaled in an angle bracket 84. The angle bracket 84, in turn, is connected to one of the frame bars 16 by a fastening element or bolt 86 which also serves to connect the stirrup member 58 to the frame bar. Sufficient play is provided between the top journal of the shaft 82 and the bracket 84 to permit the limited movement of the stirrup 58 necessary to move the stirrup between and from between the roller 56 and the bracket 52 in connecting and disconnecting the implement structure with the tractor.

It will be noted that the implement beams 24 are provided with divergent rear portions so that when two or more tillage tools are mounted on a beam, the lateral spacing of the tools may be varied by varying the spacing of the tools on the beam.

Thus it will be seen from the preceding description that an implement structure is provided in combination with a two-wheeled tractor, which is simple in construction, flexible in operation, and readily attached to or detached from the tractor.

It will be noted that the stirrup member 58 normally rests on the roller 56 so that the relative positions of the implement structure and the tractor may be easily shifted during the steering operation.

In carrying out the steering operation, the operator grasps the handle 64 in one hand and moves the handle to the left or right, depending on the direction in which he desires the tractor to travel.

When the handle 64 is moved to the left, the arm portion 70 moves the rod 72 forwardly for rotating the vertical shaft 82 which results in the tractor being turned to the right relatively to the implement structure. When the handle is moved to the right, then the tractor is turned to the left relatively to the implement structure.

The tillage tools which may be carried by the beams 24 may be lifted free of the ground, such as when a rock or other obstruction is encountered, by lifting the handle bars 16. When the handle bars 16 are lifted, the stirrup member 58 engages the flange portion 54 of the bracket 52 for lifting the implement beams 24 and the tools carried thereby.

The device is used as follows: When it is desired to adjust the relation of the implement frame (and accordingly the implements attached thereto) laterally relative to the tractor, while the tractor is at rest, the operator raises the tractor by raising one of its handles 20 until the implements are substantially clear of the ground, and, while the implements are so elevated, he uses his other hand to swing the steering lever 64 in the direction to effect the desired adjustment. He then allows the implement frame to descend as far as it will go. When the tractor starts to draw the implements, and throughout the movement of the tractor in service, the operator retains his grip on the tractor handle to prevent the tractor from wandering, which it might otherwise do because of stones or other obstructions, and he also retains his grip on the steering lever to guide the implement frame so that it will follow irregularities in the row of plants and to prevent the implement frame from similarly wandering relative to the tractor. He can steer the tractor by pushing or pulling laterally on the tractor handle while the tractor is in motion, and in such event he will still have to control the steering lever to maintain the implement frame in the desired relation to the row of plants. He varies the adjustment while the tractor is moving forward by simply exerting lateral force one way or the other, as desired, on the steering lever. The operator will find it convenient to operate the steering lever with his more dextrous hand, and either the right or left tractor handle 20, as the case may be, with his other hand.

From the above it will be seen that a tractor implement is provided which is particularly adapted for meeting the service requirements resulting from small scale farming operation.

Modifications and changes may be made without departing from the spirit of the invention, and it is intended that the invention be limited only by the scope of the appended claims.

We claim:

1. The combination with a tractor having a pair of rearwardly extending handle bars of a trailing implement comprising a draft member connected to the tractor, a plate member pivotally connected to the draft member, a pair of spaced beams pivotally connected to the plate member and extending rearwardly, said beams being swingable transversely to the direction of travel, a spacing member adjustably connected to the beams for retaining the beams in spaced positions, and manually operable means carried by the handle bars and operatively connected to the spacing member for swinging the beams transversely to the direction of travel.

2. The combination with a tractor having a pair of rearwardly extending handle bars of a trailing implement comprising a draft member connected to the tractor, a pair of spaced plate members pivotally connected to the draft member, a pair of spaced beams extending between the plate members and pivotally connected therewith, said beams being extended rearwardly and swingable transversely to the direction of travel, a spacing member connected to the beams for retaining the beams in spaced positions, and manually operable means carried by the handle bars and operatively connected to the spacing member for swinging the beams transversely to the direction of travel.

3. The combination with a tractor having a pair of rearwardly extending handle bars of a trailing implement comprising a draft member connected to the tractor, a pair of spaced plate members pivotally connected to the draft member, a pair of spaced beams extending between the plate members and pivotally connected therewith, said beams being extended rearwardly and swingable transversely to the direction of travel, a spacing member connected to the beams for retaining the beams in spaced positions, a stiffening member connected to a plate member and the spacing member for retaining the beams in given relative positions, and manually operable means carried by the handle bars and operatively connected to the spacing member for swinging the beams transversely to the direction of travel.

4. The combination with a tractor having a pair of rearwardly extending handle bars of a trailing implement comprising a draft member connected to the tractor, a plate member pivotally connected to the draft member, a pair of spaced beams pivotally connected to the plate member and extending rearwardly, said beams being swingable transversely to the direction of travel, a spacing member adjustably connected to the beams for retaining the beams in spaced positions, a stiffening member connected to the plate member and the spacing member for retaining the beams in given relative positions, and manually operable means carried by the handle bars and operatively connected to th  spacing member for swinging the beams trans;ersely to the direction of travel.

5. The combination with a tractor having a pair of rearwardly extending handle bars of a trailing implement comprising a pair of spaced beams pivotally connected to the tractor and extending rearwardly therefrom, said beams being swingable transversely to the direction of travel, a depending stirrup member connected to the handle bars, a spacing member connected to the beams for retaining the beams in the spac d positions, a keeper connected to the spacing member for receiving the stirrup member for limiting vertical movement of the beams relatively to the tractor, and a steering mechanism carried by the handle bars and the stirrup member and operatively connected to the keeper for swinging the beams transversely to the direction of travel.

6. The combination with a tractor having a pair of rearwardly extending handle bars of a trailing implement comprising a draft member connected to the tractor, a plate member pivotally connected to the draft member, a pair of spaced beams pivotally connected to the plate member and extending rearwardly therefrom, said beams being swingable transversely to the direction of travel, a spacing member connected to the beams for retaining the beams in spaced positions, a depending member connected to the handle bars, a keeper connected to the spacing member and cooperant with the depending member for limiting vertical movement of the beams relatively to the tractor, a stiffening member connected to the plate member and the keeper for retaining the beams in given relative positions, and a steering mechanism carried by the handle bars and the depending member and operatively connected to the keeper for swinging the beams transversely to the direction of travel.

7. The combination with a tractor having a pair of rearwardly extending handle bars of a trailing implement connected therewith and swingable relatively thereto transversely to the direction of travel, a steering handle carried by the handle bars, a depending member connected to the handle bars, a vertical shaft oscillatably carried by the depending member and the handle bars, and linkage operatively connecting the shaft to the handle and the implement for swinging the implement transversely to the direction of travel when the handle is moved.

8. The combination with a tractor having a pair of rearwardly extending handle bars of a trailing implement connected therewith and swingable relatively thereto transversely to the direction of travel, a steering handle carried by the handle bars, a depending member connected to the handle bars, a vertical shaft oscillatably carried by the depending member and the handle bars, radially extending arms connected to the shaft, and linkage operatively connecting one of said arms to the handle and the other of said arms to the implement for swinging the implement transversely to the direction of travel when the handle is moved.

9. The combination with a tractor having a pair of rearwardly extending handle bars of a trailing implement connected therewith and swingable relatively thereto transversely to the direction of travel, a steering handle carried by the handle bars, a pair of bracket members connected to a handle bar, a vertical shaft journaled in the bracket members, radially extending arms connected to the shaft, and linkage operatively connecting one of said arms to the handle and the other of said arms to the implement for swinging the implement transversely to the direction of travel when the handle is moved.

10. The combination with a tractor having a pair of rearwardly extending handle bars of a trailing implement connected therewith and swingable relatively thereto transversely to the direction of travel, a steering handle carried by the handle bars, a pair of bracket members connected to a handle bar, a vertical shaft journaled in the bracket members, a pair of radially extending arms connected to top and bottom portions of the shaft and positioned in transverse relationship, a link operatively connecting the top arm to the handle, and a link operatively connecting the bottom arm to the implement for swinging the implement transversely to the direction of travel when the handle is moved.

11. The combination with a tractor having a pair of rearwardly extending handle bars and a cross bar connected to the handle bars of a trailing implement connected to the tractor and swingable relatively thereto transversely to the direction of travel, a steering handle oscillatably connected to the cross bar, a depending member connected to the handle bars, a vertical shaft oscillatably carried by the depending member and the handle bars, radially extending arms connected to the shaft, and linkage operatively connecting one of said arms to the handle and the other of said arms to the implement for swinging the implement transversely to the direction of travel when the handle is moved.

WILLIAM L. ZINK.
GEORGE L. McKIBBEN.